(12) United States Patent
Blanchet et al.

(10) Patent No.: US 6,461,756 B1
(45) Date of Patent: Oct. 8, 2002

(54) RETENTION SYSTEM FOR FUEL-CELL STACK MANIFOLDS

(75) Inventors: Scott Blanchet, Monroe; Michael Cramer, New Milford; Richard F. Zepko, Oxford, all of CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/636,452

(22) Filed: Aug. 11, 2000

(51) Int. Cl.[7] ............................................... H01M 8/02
(52) U.S. Cl. .......................................... 429/37; 429/38
(58) Field of Search ..................................... 429/37, 38

(56) References Cited

U.S. PATENT DOCUMENTS

| | | | | |
|---|---|---|---|---|
| 4,345,009 A | * | 8/1982 | Fahle et al. .................... | 429/37 |
| 4,973,531 A | * | 11/1990 | Zaima et al. ................... | 429/37 |
| 5,419,981 A | * | 5/1995 | Golben .......................... | 429/37 |

* cited by examiner

Primary Examiner—John S. Maples
(74) Attorney, Agent, or Firm—Robin, Blecker & Daley

(57) ABSTRACT

A fuel-cell stack manifold retention system in which a number of flexible spring loaded belt members adapted to expand, contract and slide are used to hold the manifolds of a fuel-cell stack in place against the faces of the stack.

36 Claims, 12 Drawing Sheets

$$\sum F_x = F - T\sin(\theta) = 0$$

$$\rightarrow F = T\sin(\theta)$$

$$\sum F_y = T\cos(\theta) - P = 0$$

$$\rightarrow P = T\cos(\theta)$$

$$\sum M_o = F \cdot h - T \cdot l = 0$$

$$\rightarrow h = \frac{l}{\cos(\theta)}$$

RETENTION SYSTEM FOR FUEL-CELL STACK MANIFOLDS

BACKGROUND OF THE INVENTION

This invention relates to fuel-cell stacks having external manifolds and, in particular, to a retention system for maintaining the external manifolds in sealing relationship to the fuel-cell stack.

A fuel-cell is a device which transforms chemical energy in the form of fuel (e.g., natural gas, bio-gas, methanol, diesel fuel, etc.) directly into electrical energy by way of an electrochemical reaction. Like a battery, a fuel-cell contains two electrodes, an anode and a cathode. Unlike a battery the fuel-cell will produce electrical power as long as fuel and oxidant are delivered to the anode and cathode, respectively. The major advantage of fuel-cells over more traditional power generation technologies (e.g., IC engine generators, gas or steam turbines, etc.) is that the fuel-cell converts chemical to electrical energy without combusting the fuel. The efficiency of the fuel-cell is, therefore, not thermodynamically limited, as are heat engines, by the Carnot cycle. This allows fuel-cell based systems to operate at a far higher efficiency than traditional power plants thereby reducing fuel usage and byproduct emissions. Additionally, due to the controlled nature and relatively low temperature of the chemical reactions in a fuel-cell, the system produces nearly zero pollutant emissions of hydrocarbons, carbon monoxide, nitrogen oxides and sulfur oxides.

Fuel-cells are typically arranged in stacked relationship. A fuel-cell stack includes many individual cells and may be categorized as an internally manifolded stack or an externally manifolded stack. In an internally manifolded stack, gas passages for delivering fuel and oxidant are built into the fuel-cell plates themselves. In an externally manifolded stack, the fuel-cell plates are left open on their ends and gas is delivered by way of manifolds or pans sealed to the respective faces of the fuel-cell stack. The manifolds thus provide sealed passages for delivering fuel and oxidant gasses to the fuel-cells, thereby preventing those gasses from leaking either to the environment or to the other manifolds. The manifolds must perform this function under the conditions required for operation of the fuel-cell and for the duration of its life.

An important aspect of the performance of a fuel-cell stack manifold is the gas seal established between the manifold edge and the stack face. As the stack face is typically electrically conductive and has an electrical potential gradient along its length and the manifold is typically constructed from metal, a dielectric insulator is needed to isolate the manifolds from the fuel-cell stack. As the dielectric insulator is typically constructed from ceramic which tends to be brittle, care must be taken in how the manifolds are compressed against the stack face so as not to damage the dielectrics.

Another requirement of fuel-cell stack manifolds relates to the fact that typically a fuel-cell stack will shrink over its life as the cell components creep and densify at high temperature. For a tall fuel-cell stack the total height may decrease by 2–3 inches. This means that continuous, metal manifolds cannot be fixed to both the top and bottom of the stack but must, instead, be allowed to slide relative to the stack face. Therefore, the retention system employed to compress the manifolds against the fuel-cell stack must maintain adequate normal force to prevent gas leakage while allowing the manifolds to slide along the stack face. In addition, the forces cannot be so great that the dielectric insulators are caused to break.

Due to its inherently non-uniform temperature distribution, a tall fuel-cell stack also tends to bow. Horizontal deflection of the top of the stack at high temperature can be as much as 1–2 inches relative to the base of the stack. This places a further burden on the manifolds and retention system which are required to flex with the bowing stack in order to maintain tight gas seals.

Fuel-cells operate at temperatures above ambient (Polymer Electrolyte Fuel-cells, "PEFC": ~80° C.; Phosphoric Acid Fuel-cells, "PAFC": ~200°; Molten Carbonate Fuel-cells, "MCFC": ~650° C.; Solid Oxide Fuel-cells, "SOFC": ~1000° C.). Therefore, the selection of materials and the mechanical design must allow the components to last for the life of the fuel-cell stack (typically years). Component stress and corrosion must be considered relative to the environment in which these components must perform. In the case of MCFC and SOFC the temperatures are high enough and the lifetime long enough that long term creep of metallic components must be considered in their design.

The current state of the art fuel-cell manifold retention system used by the assignee of the subject application for carbonate fuel-cell stacks includes rigid mechanical members and springs which attempt to apply exclusively normal load to the rails of the manifolds. The components are constructed from high-temperature, corrosion-resistant materials such as nickel-based alloys and stainless steels. Leaf springs are used to transfer the tension developed in the rigid members to the manifold rails in multiple locations. This is done to provide as uniform a pressure under the manifold rails as possible. As the leaf springs see a relatively high stress level, they are intricately designed with tight dimensional tolerances so as to minimize this stress and extend their life.

The current design uses a large quantity of different parts to satisfy the requirements for a uniformly distributed normal load application to the manifold as well as to allow both stack shrinkage and stack bowing. The selected materials, intricacy of the geometry and large number of parts used in this design make it expensive, heavy and difficult to install. Also, the current system is designed to function completely independently from the manifolds and, as such, results in certain redundancies of material which add to the cost, weight and complexity of the fuel-cell stack.

Other fuel-cell stack manifold retention systems are described in various issued patents. A number of these patents are listed below:

| | |
|---|---|
| U.S. Pat. No. 4,345,009 | U.S. Pat. No. 4,670,361 |
| U.S. Pat. No. 4,212,929 | U.S. Pat. No. 4,849,308 |
| U.S. Pat. No. 4,337,571 | U.S. Pat. No. 4,794,055 |
| U.S. Pat. No. 4,873,155 | U.S. Pat. No. 4,260,067 |
| U.S. Pat. No. 4,467,018 | U.S. Pat. No. 4,444,851 |
| U.S. Pat. No. 4,738,905 | U.S. Pat. No. 4,490,442 |
| JP 6-129075 | U.S. Pat. No. 4,794,055 |
| U.S. Pat. No. 4,407,904 | U.S. Pat. No. 5,811,202 |

It is, therefore, an object of the present invention to provide a fuel-cell stack manifold retention system which does not suffer from the above disadvantages.

It is a further object of the present invention to provide a fuel-cell stack manifold retention system which is less costly, less complex and easier to assemble.

It also an object of the present invention to provide a fuel-cell stack manifold retention system which better allows for stack bowing and stack shrinkage.

It is yet another object of the present invention to provide a fuel-cell stack retention system which is lighter in weight and results in more effective gas sealing.

SUMMARY OF THE INVENTION

In accordance with the principles of the present invention, the above and other objectives are realized in a fuel-cell stack manifold retention system which includes a number of strap members for retaining the stack manifolds against the corresponding stack faces. Each strap member extends over an extent of a manifold and an attachment assembly attaches the strap members to the fuel-cell stack. The strap members are further adapted to expand, contract and slide. In this way the strap members are able to hold the manifolds against the faces of the fuel-cell stack so as to accommodate changes in the fuel-cell stack geometry caused by temperature changes and material creep.

In the embodiment of the invention to be disclosed hereinbelow, each strap member is connected to one manifold, extends around the adjacent manifold and the attachment assembly connects the strap members to the opposite side of the stack. Also, in the disclosed embodiment, the strap members are spring loaded to provide the expansion and contraction. Additionally, the attachment assembly includes truss members for supporting the length of the strap members extending over the manifolds and yoke assemblies and hook members for holding the ends of the strap members. Certain of these components are fixedly secured to the manifolds, as by welding, or they can be designed as part of the manifolds themselves.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
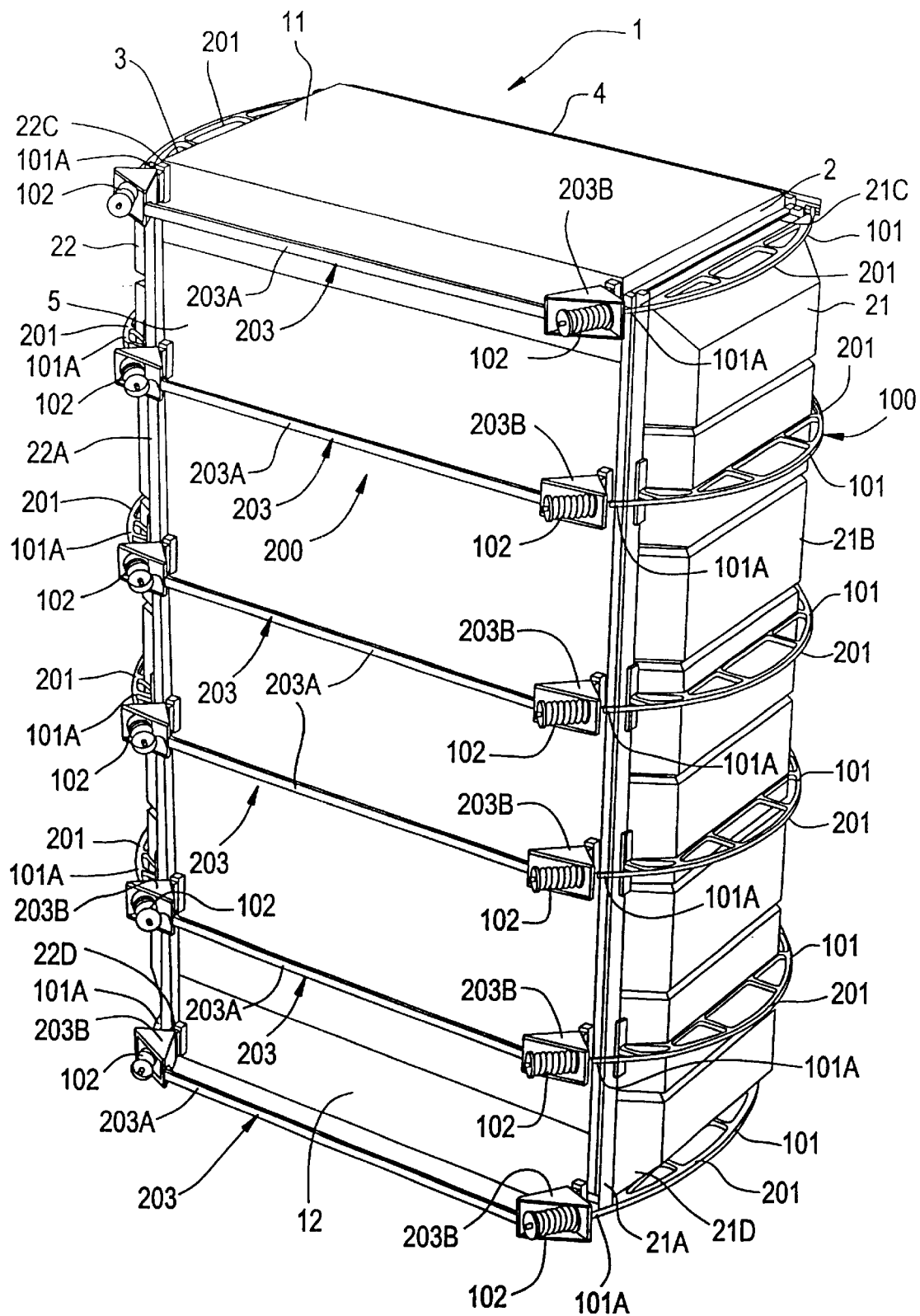
FIGS. 1–4 show various views of a fuel-cell stack including a fuel-cell stack manifold retention system in accordance with the principles of the present invention.
Figure 2:
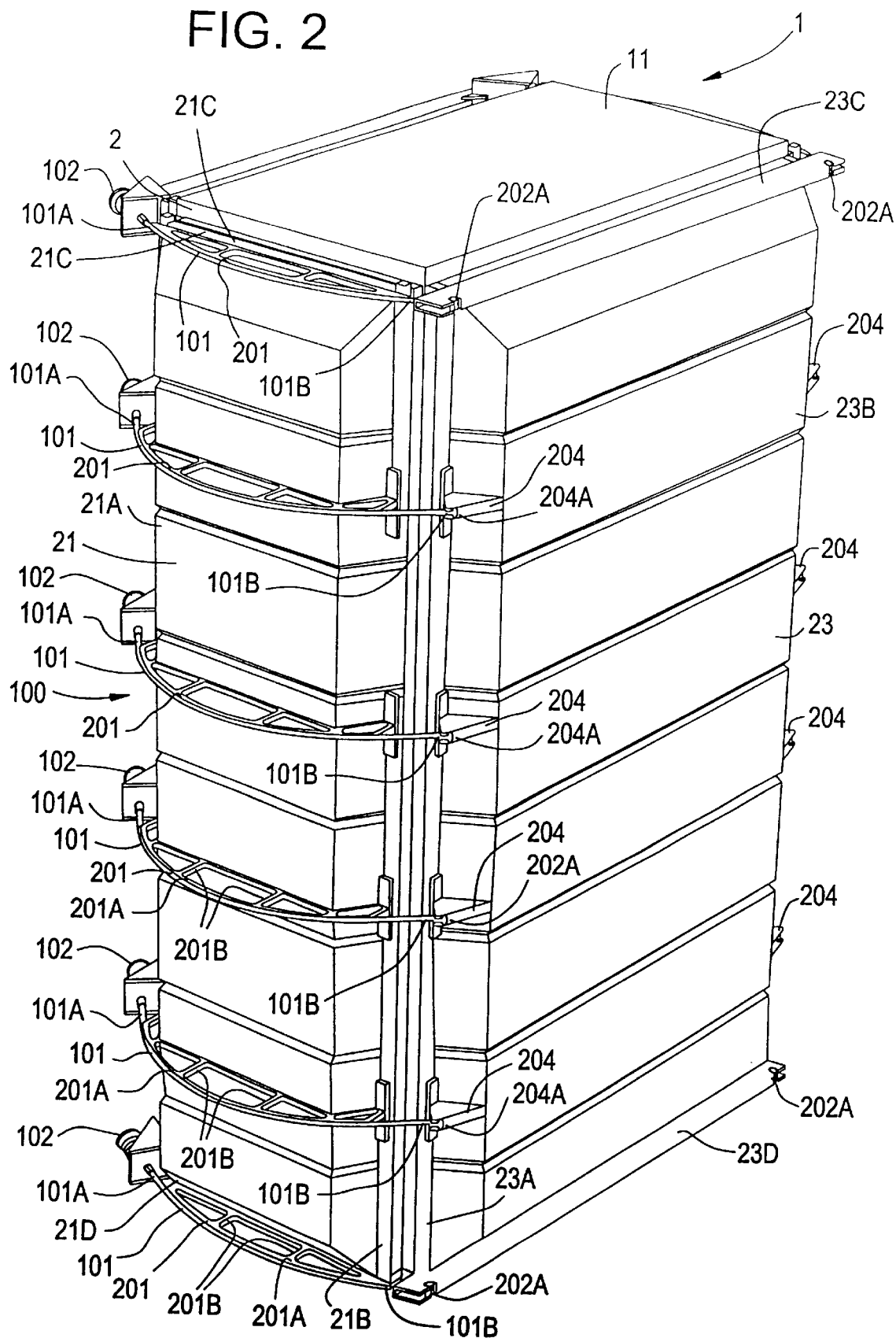
Figure 3:
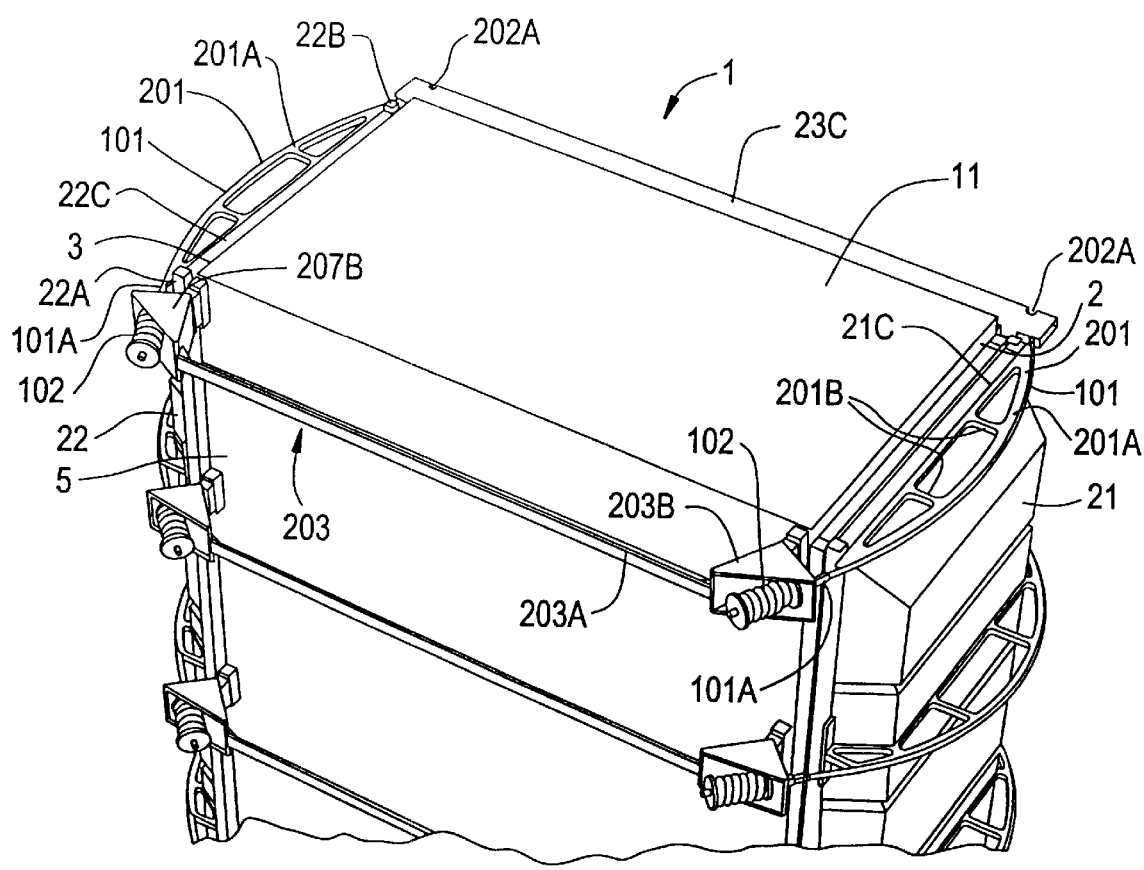
Figure 4:
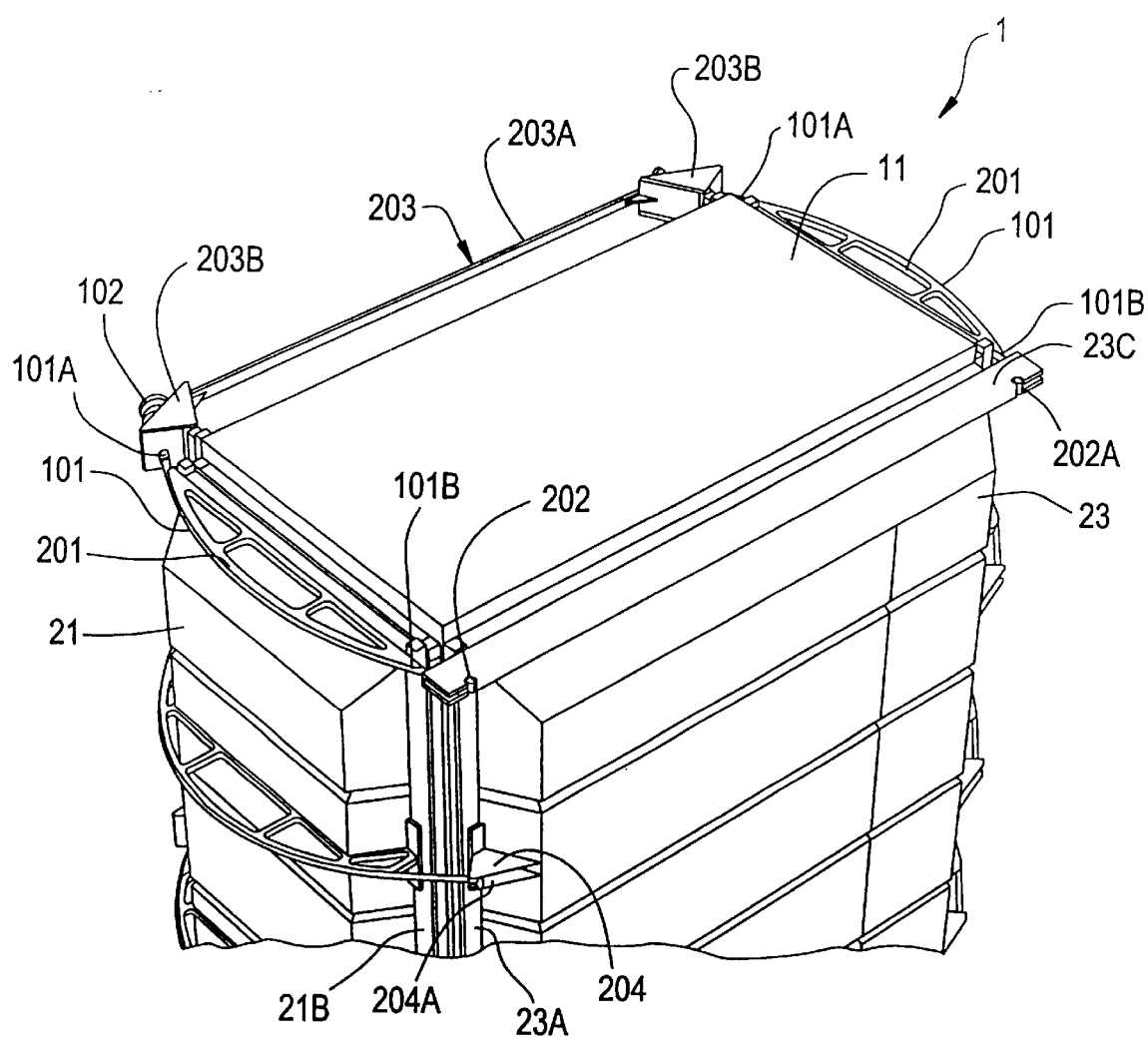

FIGS. 1–4 show a fuel-cell stack 1 including a fuel-cell stack retention system 100 in accordance with the principles of the present invention. The fuel-cell stack 1 comprises a plurality of stacked fuel-cells to which process gases are fed and exhaust gases extracted via gas manifolds. End plates 11 and 12 are also situated at the top and bottom of the stack.

For the illustrative fuel-cell stack of FIGS. 1–4, three manifolds 21, 22, and 23 are utilized. These manifolds serve as the fuel inlet and outlet manifolds and the oxidant-outlet manifold, respectively, and lie adjacent the stack faces 2, 3 and 4. A fourth manifold serving as the oxidant inlet is associated with the fourth stack face 5 and is provided by a vessel into which the stack is inserted. This vessel is not shown in the figures.

It should be noted that the principles of the invention apply equally as well to stacks having all their manifolds adjacent respective stack faces. Moreover, the principles of the invention are intended to apply to stacks having any number of faces and manifolds.

In the case shown, each of the manifolds 21, 22 and 23 abuts its respective stack face 2, 3 and 4 via top and bottom horizontal rails and left and right vertical rails. The rails of each manifold are required to provide a gas sealing interface with the respective stack face under the various operating conditions of the stack 1. As illustrated, the manifold 21 has vertical rails 21A, 21B and horizontal rails 21C, 21D; the manifold 22 has vertical rails 22A, 22B and horizontal rails 22C, 22D; and the manifold 23 has vertical rails 23A, 23B and horizontal rails 23C, 23D.

While not visible, between each manifold rail and its respective stack face is a dielectric insulator. These insulators electrically isolate the manifolds from the stack and their integrity must be preserved in realizing the gas seal between the manifolds and the stack faces.

In accordance with the principles of the present invention, the stack manifold retention system 100 includes strap members 101 and a strap attachment assembly 200. The strap members 101 hold the manifolds 21, 22 and 23 in sealing engagement with the stack faces and the attachment assembly 200 attaches the strap members 101 to the stack 1.

Each strap member 101 extends over an extent of a corresponding manifold and is adapted to expand, contract and slide to accommodate changes in the stack geometry and the stack components resulting from the operating conditions of the stack. In this way, the strap members 101, can be made to exert a desired pressure against the horizontal and vertical rails of the manifolds 21, 22 and 23, thereby sealing the rails against the stack faces, while still maintaining the integrity of the dielectric insulators.

In the illustrative case shown, the fuel-cell stack 1 is rectangular, i.e., the stack faces 4 and 5 are of equal width b greater than the equal width a of the stack faces 2 and 3, and the strap members 101 have been routed only around the shorter faces 2 and 3 of the stack. This minimizes the length of the strap members and, therefore, the creep that occurs in the strap members over time. Moreover, the strap members 101 not only hold the surrounded manifolds 21 and 22 in place, but also the manifold 23.

More particularly, six strap members 101 are distributed along the length of each of the manifolds 21 and 22. Each strap member 101, furthermore, has an extent which extends over the width of the respective manifold and each strap member 101 has end sections 101A and 101B.

Each strap member can be designed as a multi-wire rope (cable) or as laminated, flat strips or as any other member providing the required flexibility to encompass and slide relative to the manifolds. To this end, each strap member 101 can be sheathed in a flexible ceramic tube (braided) in order to both reduce friction between the strap member and its supporting surface and to prevent corrosion debris from falling from the strap member into the surrounding environment. Alternately, the strap members can be coated with an appropriate high temperature, corrosion resistant coating.

The sliding function of the strap members is advantageous in permitting the extent of the straps extending around the manifolds to be increased and decreased as thermal expansion and contraction of the fuel-cell stack results in a change in the perimeter of the stack. In particular, the variation in length of the path occupied by a strap member is accounted for through relative sliding of the strap with respect to the manifolds. In this way, a desired load can be applied to all manifolds regardless of the temperature of the stack.

To permit each strap member 101 to expand and contract its respective length or extent, each strap member is spring loaded. More particularly, each strap member 101 is provided with a spring assembly 102 at its end portion 101A. The spring assembly 102 holds its respective strap member 101 taught and is designed to apply the proper load at temperature to achieve the desired manifold pressure against the dielectric insulator at the stack face. Moreover, as can be appreciated, each spring assembly makes up for differences in strap member path length due to thermal expansion of the system and also takes up slack in the strap member caused by thermal contraction or other effects such as material creep at high temperatures.

Figure 6:
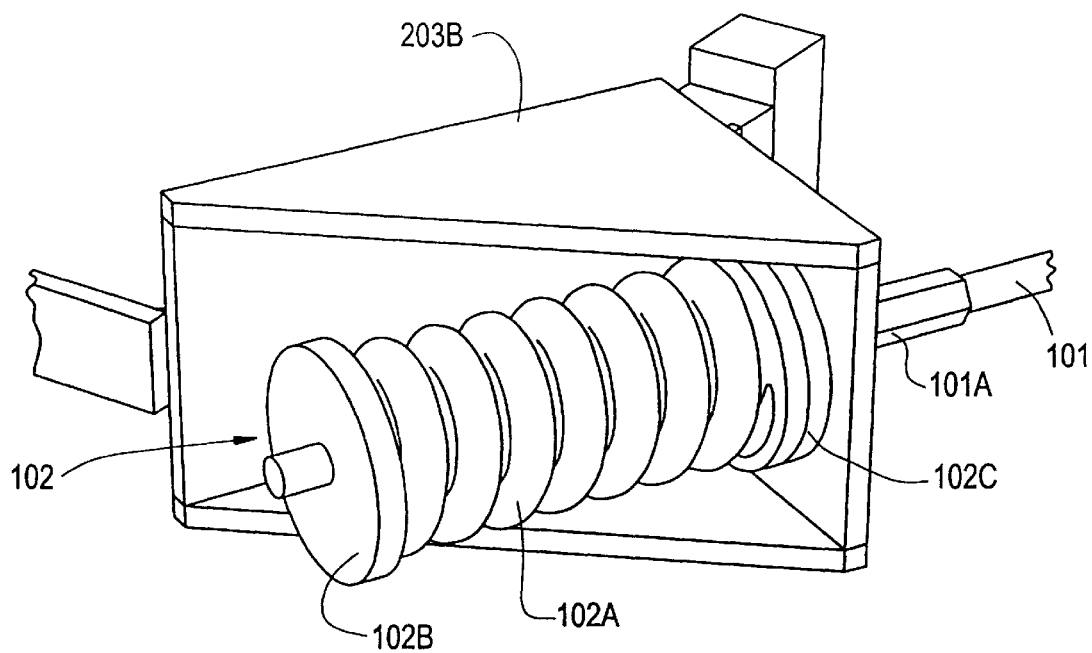
FIGS. 6–8 show the configuration of various ends of the strap members of the fuel-cell stack manifold retention system of FIGS. 1–4.

In the disclosed embodiment, as seen more clearly in FIG. 6, the spring assembly 102 includes a coil spring 102A in compression. The spring 102A is in surrounding relationship with its respective strap member at the end section 101A and has one end attached to a stop member 102B. The stop member 102B also surrounds the strap member end section 101A and is fixedly attached to its terminal end. A second stop member 102C is located at the other end of the spring and also surrounds the end section of the strap member.

As shown, the stop members 102B and 102C are washers, with the stop member 102C being a self-aligning washer. The spherical shape of each washer allows it to pivot to make up for small differences in strap angle due to manufacturing and assembly variations. Cylindrical and other curved shapes can also be used.

Likewise, other types of springs may be used for the spring 102A. Thus, for example, extension, belleville, torsion and leaf spring configurations could also be employed.

Also, it is important that each strap member 101 run parallel to the axis of its associated spring. This insures that no lateral loads are applied that may cause the spring to tip and also insures that high bending stresses are not imparted to the strap end.

The path for routing the each strap member 101 around its respective manifold depends on the pressure distribution desired at the manifold rails. In this embodiment, a uniform and equal pressure is desired on all areas of the manifold rails. This being the case, for the strap members which apply pressure to the vertical rails of the manifolds, i.e., for the strap members which are situated between the uppermost and lowermost strap members, the strap members are routed so that sections of the strap members adjacent the vertical rails of adjacent manifolds should form a 45° angle with the associated faces of the stack. This results in the strap tension being equally distributed to all vertical manifold rails equally. In particular, the force applied to each vertical rail will equal $\sqrt{2}/2$ times the tension in the strap member.

Figure 5:
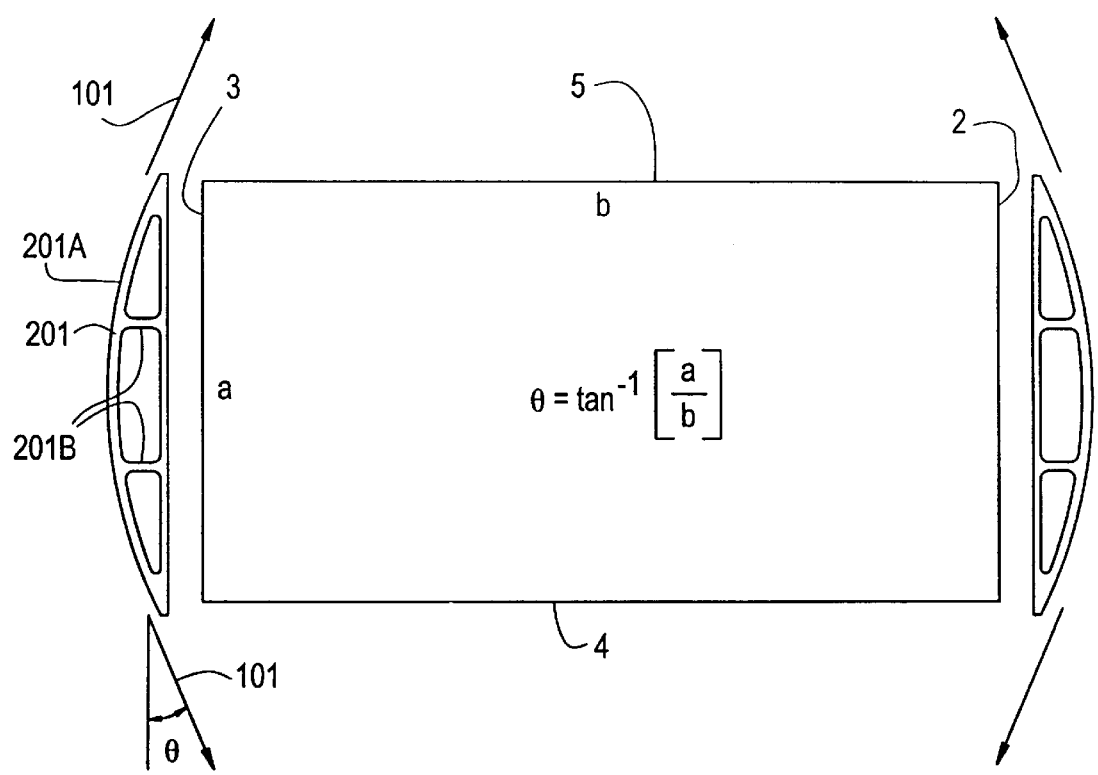
FIG. 5 shows pictorially the path followed by certain of the strap members of the fuel-cell stack manifold retention system of FIGS. 1–4.

The strap members routed to apply pressure to the horizontal rails of the manifolds, i. e., the uppermost and lowermost strap members surrounding a manifold, on the other hand, should be routed at an angle determined by the aspect ratio of the widths of the corresponding adjacent stack faces. This is depicted pictorially in FIG. 5.

For the stack 1 of FIG. 1, where adjacent stack faces are of different widths a and b, i.e., for a stack with a rectangular footprint, the angle as measured from the shorter face is equal to the arctangent of the ratio of the shorter face width a to the longer face width b. This angle, also depicted in FIG. 5, allows the tension in the strap member to be split between the shorter and longer horizontal manifold rails such that equal sealing pressure is achieved. As can also be appreciated, from this figure, where the stack faces are of equal length, i.e., for a stack with a square footprint, the routing angle $\theta=45°$.

In order for the strap members 101 to be able to retain the manifolds 21, 22 and 23 in place in the manner described above, the attachment assembly 200 includes truss members 201, yoke assemblies 203 and hook members 204. The truss members each comprise an upper curved section 201A and leg members 201B. Each yoke assembly includes a belt member 203A having at each of its ends a spring support ear or member 203B.

The truss members 201 extend over the width of the respective manifolds 21 and 22. The hook members 204 are connected to the vertical rails 23A and 23B of the manifold 23. Preferably, the truss members and hook members are integral with their respective manifolds. This can be achieved by welding the truss members and hook members to the manifolds. Alternatively, the truss members and hook members could be designed integrally as parts of their respective manifolds.

Figure 7:
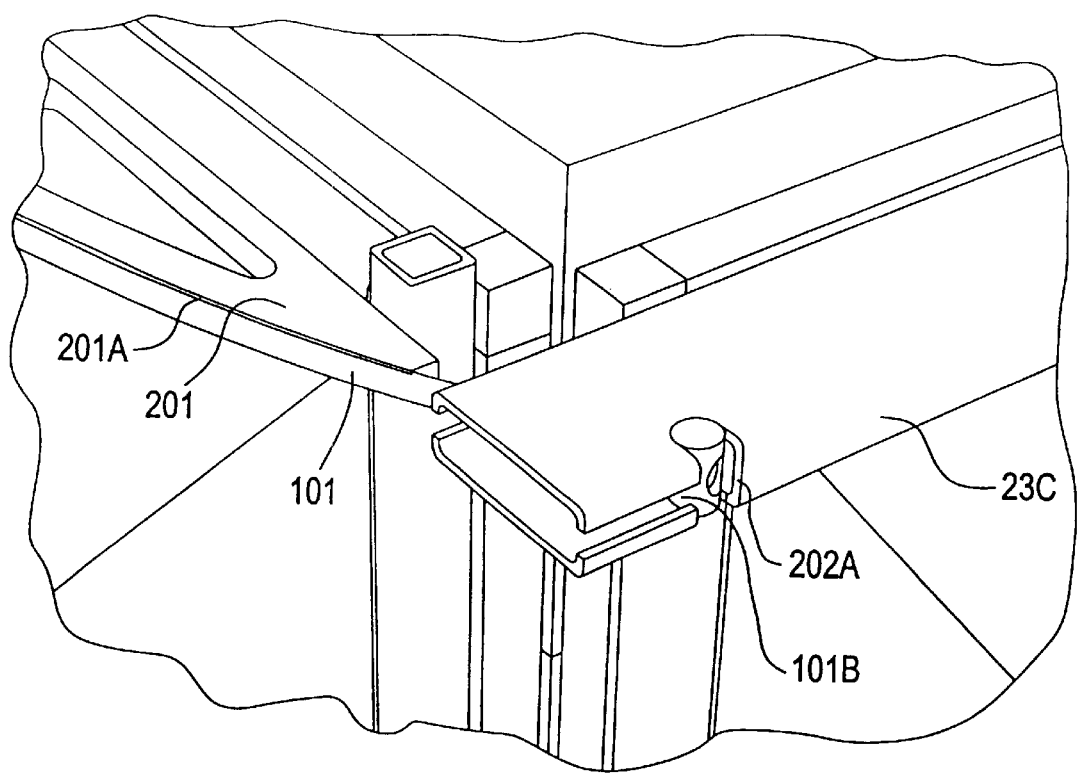
Figure 8:
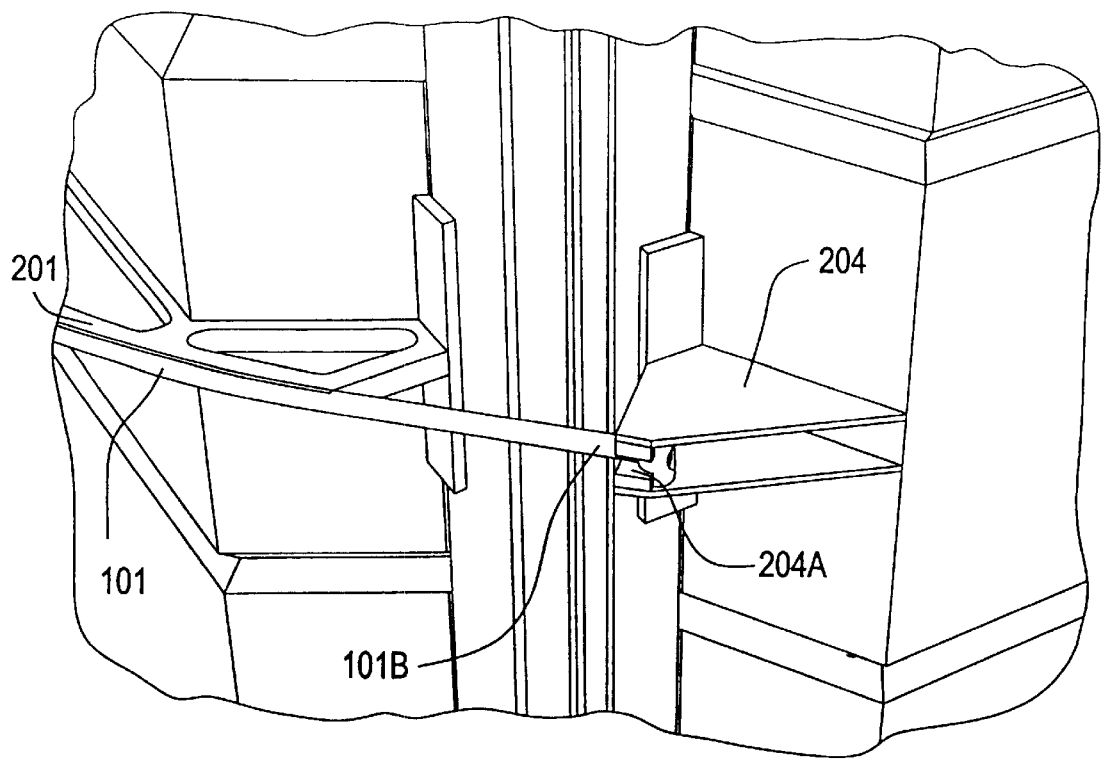

As shown more clearly in FIGS. 7 and 8, the manifold horizontal rails 23C and 23D have slots 202A and the hook members 204 include slots 204A for capturing the ends 101B, i.e., the dead ends, of the associated strap members 101. These strap members 101 then pass over the respective curved sections 201A of the truss members 201. The curvature of each truss section 201 A is such as to realize the above-mentioned desired routing of the strap members 101 to achieve substantially equal, constant pressure at the manifold rails.

In particular, each section 201A has the curvature of a circular sector. In this way, each strap member can be made to leave the section 201A at a tangent point which provides the desired angle for the strap member 101 as it passes adjacent the stack faces, as discussed above.

As also discussed above, the dead end 101B of each strap member 101 is captured in the slot of either the hook member 204 or one of the horizontal rails 23C or 23D. These dead ends of the strap members are designed to pivot to make up for small differences in strap angle due to manufacturing and assembly variations. This is realized by configuring the dead ends to be cylindrical in shape, although other shapes such as, for example, spherical shapes, could also be used.

The spring assemblies 102 of the strap members 101 are brought to the face 5 of the fuel-cell stack and supported there. In particular, in order to support the spring assemblies 102 in their proper positions and orientations, while maintaining electrical isolation from the stack face, the above-mentioned yoke assemblies 203 are employed.

More particularly, the belt member 203A of each yoke assembly 203 spans the width of the face 5 of the stack. Additionally, each belt member 203A and its corresponding spring support ears 203B, which hold the spring assemblies 102 (see, FIG. 6), are designed such that the spring assemblies are properly oriented under all load conditions and no lateral loading or rotation is applied to the dielectric assemblies 205 associated with the yoke assembly 203.

The dielectric assemblies 205 are more fully discussed below and electrically isolate the spring support ear from and allow sliding of the spring support ear relative to the stack of face 5. To accomplish this, each spring support ear 203B is made sufficiently stiff so as not to deflect significantly under load. In addition, the height h from the knee of the spring support ear to the belt member 203A is chosen to provide zero moment about the knee.

Figure 9:
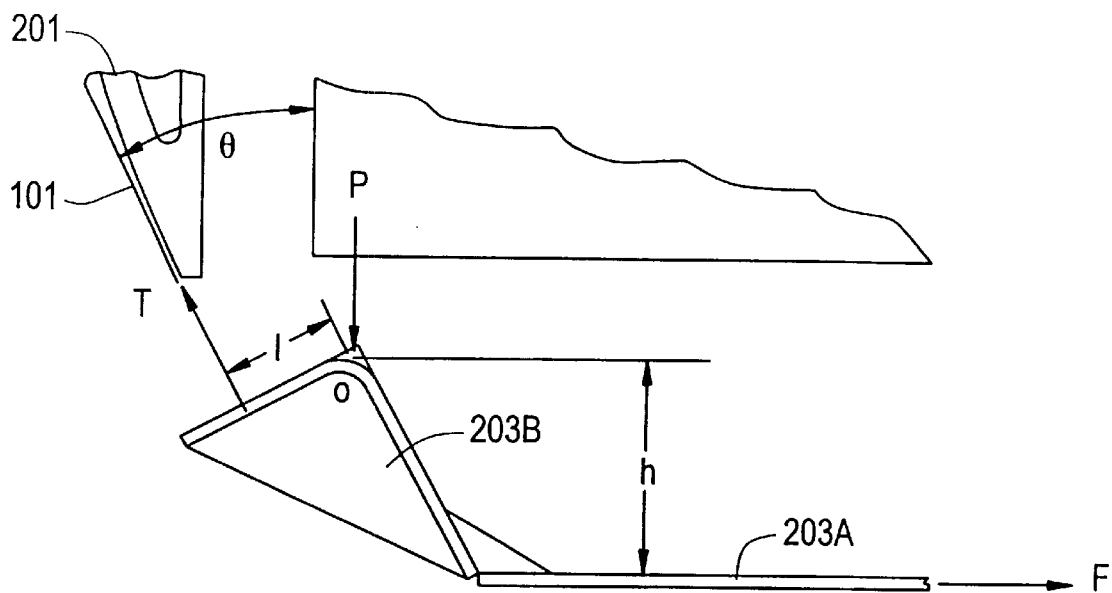
FIG. 9 illustrates the configuration of a part of the yoke assembly of the fuel-cell stack manifold retention system of FIGS. 1–4.

In particular, as shown in FIG. 9, the height, h, is found by taking the perpendicular length, 1, from the strap member 101 to the nee of the support ear 203B and dividing by the cosine of the angle which the strap member forms with the adjacent stack face (shown as the angle 6 in FIG. 9). This geometry provides zero moment at the contact point of the spring support ear with the dielectric assembly, thereby allowing the spring to maintain proper orientation and placing the belt member 203A in pure tension. This, in turn, allows the belt member 203A to be made relatively thin and light.

Figure 10:
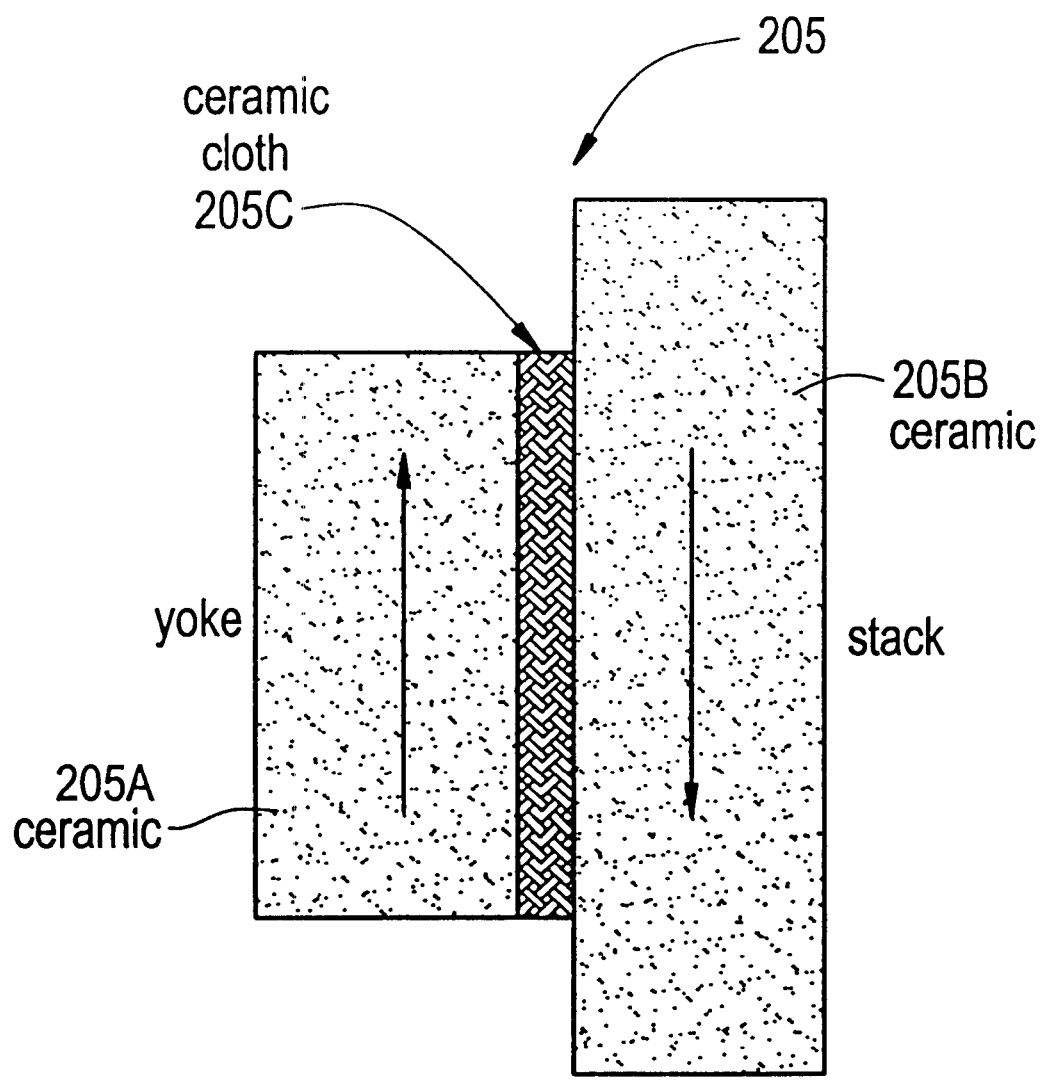
FIG. 10 illustrates the dielectric interface of the yoke assembly used in the fuel-cell stack manifold retention system of FIGS. 1–4.

As above-mentioned, each spring support ear 203B is electrically isolated from and allowed to slip relative to the fuel-cell stack face 5 by use of a dielectric assembly 205. As shown in FIG. 10, each dielectric assembly 205 includes first and second ceramic slabs 205A and 205B. These slabs are separated by a layer of ceramic cloth 205C which is situated between the slabs.

In the present illustrative case, one slab 205A is attached to the ear support at the knee, while the other is fixed to the stack face, and the cloth situated therebetween. As the stack shrinks, relative motion between the stack and ear occurs at the ceramic cloth plane. This plane provides a low friction surface with no chance of corroding and fusing.

As can be appreciated, the uppermost and bottommost strap members 101, and associated truss members 201 and yoke assemblies 203, apply the desired uniform loading pressure to the horizontal rails of the manifolds 21 and 22. In order for the horizontal rails of the manifold 23 to receive a similar holding pressure, they must be designed with sufficient stiffness so as not to deflect significantly under load at operating pressure.

As an alternative to configuring the horizontal rails 23C and 23D to hold the dead ends of the strap members 101, the horizontal rails can be made flat and tension bars having the slots 202A for capturing the dead ends of the strap members 101 can be situated against the rails. These tension bars can be configured to provide uniform loading of the rails by either one of two techniques. One technique contemplates machining each bar to give it an appropriate profile so that the bar applies uniform pressure as the member deflects. A second simpler technique is to place shims of a specific thickness under each bar so as to yield uniform pressure under each shim after the bar deflects.

Figure 11:
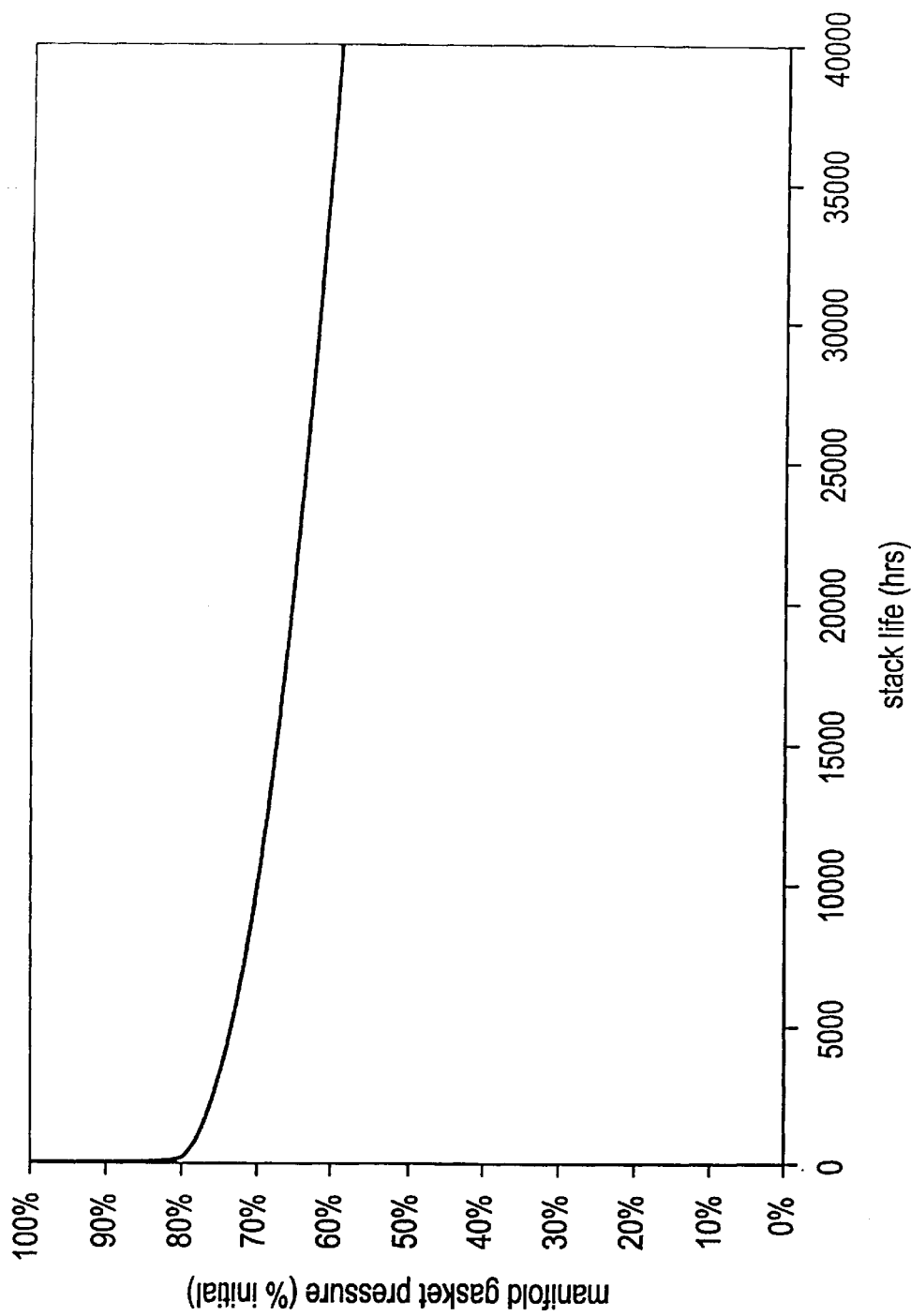
FIG. 11 shows predicted characteristics for the strap member tension and the manifold gasket pressure for the fuel-cell stack manifold retention system of FIGS. 1–4.

As can be appreciated, the highest stress components in the fuel-cell stack retention system 100 are the flexible strap members 101 and springs 102A. For these components to have reasonable weight and cost they must be designed with relatively high stress. Due to the high temperature and long life of the fuel-cells of the stack 1, long term creep of the strap members 101 and relaxation of the springs 102A must be accounted for and designed into the retention system 100. A mathematical model incorporating the high temperature creep of the strap members 101, relaxation of the springs 102A and thermal expansion of all components has been developed to optimize the strap members and spring design and provide adequate manifold gasket (dielectric insulator) pressure for the duration of stack life. Based on this model, a representative curve showing predicted strap tension and manifold gasket pressure for the duration of stack life has been generated and is shown in FIG. 11.

The creep of materials at high temperature is a non-linear phenomenon increasing exponentially with both temperature and stress level. This fact is used advantageously in the retention system 100. Due to the arrangement of the springs and strap members, the creep of both components becomes a self-limiting process (see FIG. 11). As each strap member creeps, the deflection of the spring decreases and subsequently so does the stress in the strap member and the spring. As the spring relaxes, so does the load applied to the strap member, thereby reducing the rate of creep in both components. By properly selecting the geometry of the strap member and the spring and specifying the starting spring deflection, an adequate dielectric insulator pressure is maintained through the life of the fuel-cell stack. At the beginning of stack life, a higher pressure is required to insure that the manifolds do not slip downward while the stack is shipped. Once installed, the pressure need only be enough to prevent gas leaks.

Figure 12:
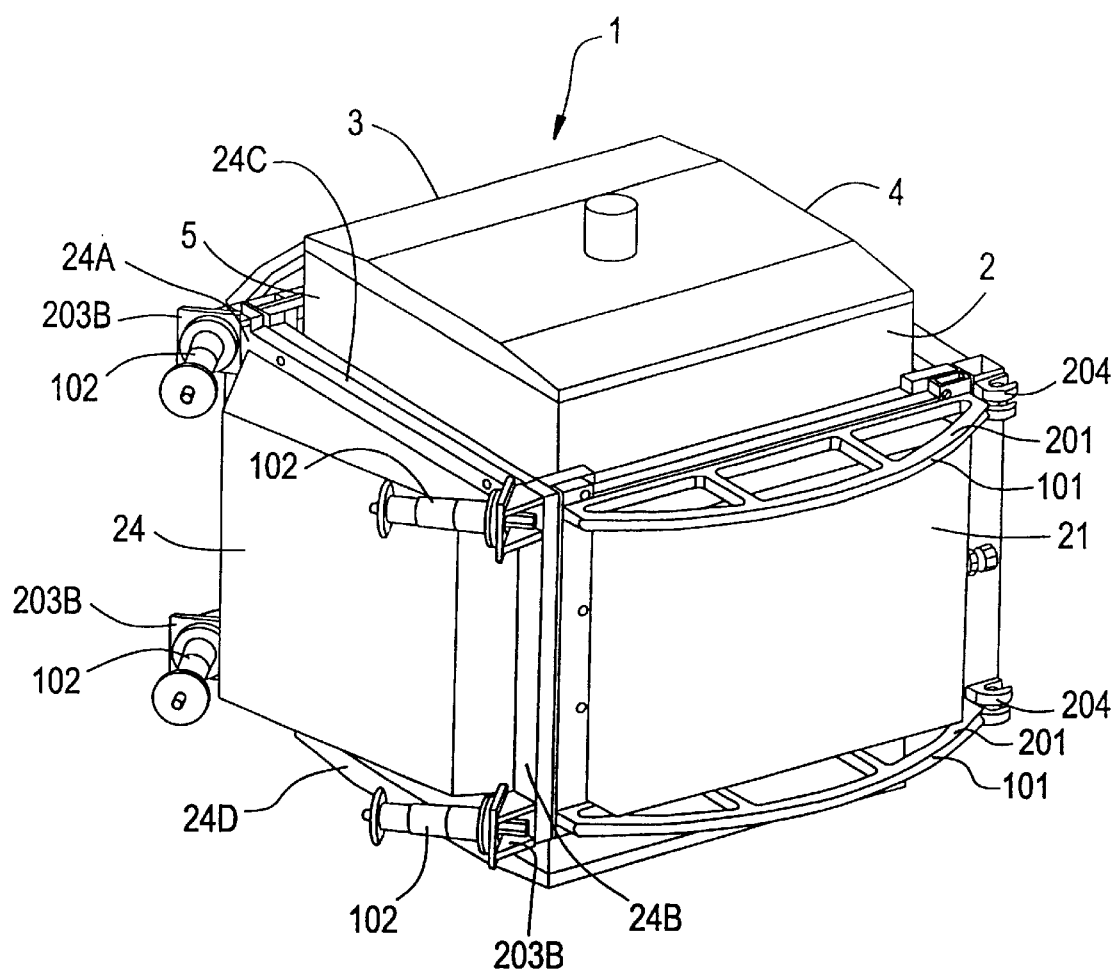
FIG. 12 illustrates a modification of the fuel-cell stack retention system of FIGS. 1–4.

FIG. 12 illustrates an alternative embodiment of the fuel-cell stack retention system of FIGS. 1–4 in which a manifold 24, acting as an oxidant inlet manifold, is situated adjacent the face 5 of the fuel-cell stack 1. The manifold 24 abuts the face 5 via vertical rails 24A, 24B and horizontal rails 24C, 24D.

In this embodiment, the spring support ears or members 203B are formed integrally with the manifold 24, either by welding or in the manifold forming. The spring support ears 203B are thus able to support the spring assemblies 102, without the need for the belt members 203A and the dielectric assemblies 205.

In all cases it is understood that-the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel-cell stack manifold retention system for use with a fuel-cell stack having a number of faces and a number of manifolds each abutting against a face of said fuel-cell stack, said fuel-cell manifold retention system holding each of said manifolds against the corresponding face of said fuel-cell stack and comprising:

a number of strap members, each said strap member extending over an extent of a corresponding manifold of the fuel-cell stack and expanding, contracting and sliding, and each said strap member being spring loaded to provide said expansion and contraction, and an attachment assembly for attaching said strap members to said fuel-cell stack;

whereby the strap members hold the manifolds to the fuel-cell stack in a manner to accommodate for changes in the fuel-cell stack geometry.

2. A fuel-cell stack retention system in accordance with claim 1, wherein:

said strap members are routed along paths between points of connection to said attachment assembly such that said strap members provide uniform loading to said manifolds.

3. A fuel-cell stack manifold retention system in accordance with claim 1, wherein:

each strap member includes: a first end; at said first end, a spring which encircles the strap member and first and second stop members abutting opposite ends of said spring, said first stop member being situated furthest from a terminal point of said first end of said strap member and being held by said attachment assembly and said second stop member being situated closest to said terminal point of said first end of said strap member and being attached to said strap member; and a second end held by said attachment assembly.

4. A fuel-cell stack retention system in accordance with claim 3, wherein:
each first and second stop member comprises a washer encircling the corresponding strap member.

5. A fuel-cell stack retention system in accordance with claim 4, wherein:
each first stop member is a self aligning washer.

6. A fuel-cell stack retention system in accordance with claim 3, wherein:
each first stop member and the second end of each strap member are pivotable.

7. A fuel-cell stack retention system in accordance with claim 6, wherein:
each first stop member and the second end of each strap member are one of spherical and cylindrical in shape.

8. A fuel-cell stack retention system in accordance with claim 3, wherein:
said attachment assembly includes: a number of truss members, each truss member including an upper curved section and legs extending downwardly from said curved section and abutting a corresponding manifold;
the truss member corresponding to each manifold supporting on the upper curved section of the truss member a strap member corresponding to the manifold.

9. A fuel-cell stack manifold retention system in accordance with 8, wherein:
each truss member is connected via the legs of the truss member to the corresponding manifold.

10. A fuel-cell stack manifold retention system in accordance with claim 9, wherein:
each truss member is welded via the legs of the truss member to the corresponding manifold.

11. A fuel-cell stack manifold retention system in accordance with claim 8, wherein:
said attachment assembly further includes: a number of hook members attached to said fuel-cell stack, each of said hook members holding a second end of a strap member; and a number of spring support members attached to said fuel-cell stack, each of said spring support members engaging a first stop member.

12. A fuel-cell stack manifold retention system in accordance with claim 11, wherein:
each of said truss members and each of said hook members is connected to a manifold.

13. A fuel-cell stack manifold retention system in accordance with claim 12, wherein:
each of said spring support members is held against a face of said stack.

14. A fuel-cell stack manifold retention system in accordance with claim 13, wherein:
each of said truss members, and each of said hook members is welded to a manifold.

15. A fuel-cell stack manifold retention system in accordance with claim 13, wherein:
said fuel-cell stack has first and second opposing faces and third and fourth opposing faces;
said fuel-cell stack includes first, second and third manifolds abutting a said first, second and third faces of said fuel-cell stack, said first, second and third manifolds each including vertical rails at the ends of the width dimension of the manifold and horizontal rails at the ends of the length dimension of the manifold;
a number of said truss members being spaced from each other along the length dimension of said first manifold and each extending along the width dimension of said first manifold;
a number of said truss members being spaced from each other along the length dimension of said second manifold and each extending along the width dimension of said second manifold;
a number of hook members being spaced from each other along the length of each of the vertical rails of said third manifold; and
a number of spring support members being spaced from each other along the length of each of the vertical sides of said fourth face of said stack.

16. A fuel-cell stack manifold retention system in accordance with claim 15, wherein:
said first and second manifolds are of equal width; and
said third and fourth manifolds are of equal width larger than the width of said first and second manifolds.

17. A fuel-cell stack manifold retention system in accordance with claim 15, further comprising:
a dielectric assembly disposed between each spring support member and said fourth face to electrically insulate the spring support member from said fourth face and allow said spring support member to slip relative to said fourth face.

18. A fuel-cell stack manifold retention system in accordance with claim 17, wherein:
each dielectric assembly includes: first and second ceramic slabs; and a dielectric cloth situated between said first and second slabs.

19. A fuel-cell stack manifold retention system in accordance with claim 17, wherein:
said attachment assembly further includes a number of belt members, each belt member connecting spring support members on opposing sides of said fourth face of said stack.

20. A fuel-cell stack manifold retention system in accordance with claim 19, wherein:
each combination of a belt member and corresponding spring support members form a yoke member, said yoke member being adapted to provide zero moment at the point of contact of the spring support members to said fourth stack face, thereby applying only a normal force thereat and maintaining proper position of the supported springs and placing said belt member in tension to minimize the cross section thereof.

21. A fuel-cell stack manifold retention system in accordance with claim 19, wherein:
first and second truss members are situated along the top and bottom horizontal rails of said first manifold;
third and fourth truss members are situated along the top and bottom horizontal rails of said second manifold;
and the top and bottom horizontal rails of said third manifold form parts of said attachment assembly, each end of said top and bottom rails of said third manifold holding a second end of a strap member situated on one of said first through fourth truss members.

22. A fuel-cell stack manifold retention system in accordance with claim 21, wherein:
the curvatures of the upper curved sections of said truss members being selected so that said strap members cause a uniform pressure to be exerted along the lengths of the vertical rails of said first, second and third manifolds and so that said strap members exert a uniform pressure along the lengths of the horizontal rails of said first and second manifolds.

23. A fuel-cell stack manifold retention system in accordance with claim 21, wherein:

the curvatures of the upper curved sections of the truss members situated along the lengths of said first and second manifolds, other than said first through fourth truss members, being selected such that the second ends of the strap members supported by the truss members are at a 45 degree angle to the adjacent faces of the fuel-cell stack crossed by said ends.

24. A fuel-cell stack manifold retention system in accordance with claim 22, wherein:

the curvatures of the upper curved sections of said first through fourth truss members are selected such that the second ends of the strap members supported by said first through fourth truss members are at an angle to the adjacent faces of the fuel-cell stack crossed by said ends based on the ratio of the widths of the adjacent faces.

25. A fuel-cell stack manifold retention system in accordance with claim 13, wherein:

said fuel-cell stack has first and second opposing faces and third and fourth opposing faces;

said fuel-cell stack includes first, second, third and fourth manifolds abutting said first, second, third and fourth faces of said fuel-cell stack, said first, second, third and fourth manifolds each including vertical rails at the ends of the width dimension of the manifold and horizontal rails at the ends of the length dimension of the manifold;

a number of said truss members being spaced from each other along the length dimension of said second manifold and each extending along the width dimension of said second manifold;

a number of said truss members being spaced from each other along the length dimension of said second manifold and each extending along the width dimension of said second manifold;

a number of hook members being spaced from each other along the length of each of the vertical rails of said third manifold; and a number of spring support members being spaced from each other along the length of each of the vertical rails of said fourth manifold.

26. A fuel-cell stack manifold retention system in accordance with claim 21, wherein:

said spring support members are integrally formed with said fourth manifold.

27. A fuel-cell stack manifold retention system in accordance with claim 26 wherein:

said spring support members are welded to said fourth manifold.

28. A fuel-cell stack manifold retention system in accordance with claim 1 wherein:

said attachment assembly includes: a number of truss members, each truss member abutting a corresponding manifold and supporting a strap member associated with that manifold.

29. A fuel-cell stack manifold retention system in accordance with claim 28 wherein:

said truss members are attached to the corresponding manifolds.

30. A fuel-cell stack manifold retention system in accordance with claim 29 wherein:

said truss members are one of welded to the corresponding manifolds and formed as part of the corresponding manifolds.

31. A fuel-cell stack manifold retention system in accordance with claim 29 wherein:

said truss members are configured so as to cause said strap members supported by said truss members to exert a uniform pressure on said manifolds.

32. A fuel-cell stack manifold retention system in accordance with claim 28 wherein:

each of said truss members has an upper curved section for supporting the strap member.

33. A fuel-cell stack manifold retention system in accordance with claim 32 wherein:

the curvatures of said upper curved sections of said truss members are selected such that the strap members supported by said upper curved sections exert uniform loading of said manifold.

34. A fuel-cell stack retention system in accordance with claim 32 wherein:

the curvature of each upper curved section is a circular.

35. A fuel-cell stack retention system in accordance with claim 1 wherein:

said strap member and spring loading are adapted to be self limiting for high temperature creep such that a required pressure is exerted against said manifolds at the end of life of said fuel-cell stack.

36. A fuel-cell stack manifold retention system in accordance with claim 1 wherein:

each said strap member includes an outer sheath formed as a braided ceramic tube.

* * * * *

UNITED STATES PATENT AND TRADEMARK OFFICE
CERTIFICATE OF CORRECTION

PATENT NO. : 6,461,756 B1
DATED : October 8, 2002
INVENTOR(S) : Scott Blanchet et al.

It is certified that error appears in the above-identified patent and that said Letters Patent is hereby corrected as shown below:

Column 7,
Line 9, delete "nee" and insert -- knee --.
Line 11, delete "angle 6" and insert -- angle θ --

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,461,756 B1 Page 1 of 1
DATED : October 8, 2002
INVENTOR(S) : Scott Blanchet et al.

It is certified that error appears in the above-identified patent and that said Letters Patent is hereby corrected as shown below:

<u>Column 1,</u>
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Second Day of May, 2006

JON W. DUDAS
*Director of the United States Patent and Trademark Office*